United States Patent [19]

Kiefer

[11] Patent Number: 5,536,100
[45] Date of Patent: Jul. 16, 1996

[54] MECHANICALLY JOINED TUBULAR CONNECTION AND PROCESS TO FORM SAME

[75] Inventor: James Kiefer, Grand Rapids, Mich.

[73] Assignee: RAN Enterprises, Inc., Grand Rapids, Mich.

[21] Appl. No.: 189,133

[22] Filed: Jan. 31, 1994

Related U.S. Application Data

[63] Continuation-in-part of Ser. No. 998,560, Dec. 29, 1992, Pat. No. 5,312,198.

[51] Int. Cl.⁶ .................................................. B21D 39/04
[52] U.S. Cl. ............................ 403/274; 403/301; 29/516; 29/521
[58] Field of Search ............................... 403/43, 48, 274, 403/300, 301; 411/408, 427; 29/505, 521, 516; 285/382

[56] References Cited

U.S. PATENT DOCUMENTS

| | | |
|---|---|---|
| 1,123,616 | 1/1915 | Stewart . |
| 1,246,456 | 11/1917 | Parpert . |
| 1,576,874 | 3/1926 | Stevens ..................................... 29/521 |
| 1,891,785 | 12/1932 | Siebert et al. . |
| 1,917,502 | 7/1933 | Crawford et al. . |
| 1,964,258 | 6/1934 | Graham . |
| 2,157,354 | 5/1939 | Sherman . |
| 2,323,758 | 7/1943 | Temple, Jr. . |
| 2,420,364 | 5/1947 | Espenas . |
| 3,125,149 | 3/1964 | May . |
| 3,193,796 | 7/1965 | Spangler ................................ 29/516 X |
| 3,209,575 | 10/1965 | Woodward, Jr. et al. . |
| 3,429,171 | 2/1969 | Feher . |
| 3,432,916 | 3/1969 | Fisher et al. ........................... 29/521 X |
| 3,501,828 | 3/1970 | Schultz . |
| 3,513,684 | 5/1970 | Price . |
| 3,590,464 | 7/1971 | Wildi et al. . |
| 3,689,111 | 9/1972 | Osmun et al. ....................... 285/382 X |
| 3,689,112 | 9/1972 | Slator et al. ........................ 285/382 X |
| 3,782,839 | 1/1974 | Majewski ................................. 403/43 |
| 4,041,301 | 8/1977 | Pelchat . |
| 4,095,450 | 6/1978 | Opland et al. . |
| 4,095,768 | 6/1978 | Chasen . |
| 4,121,528 | 10/1978 | Amado, Jr. . |
| 4,302,126 | 11/1981 | Fier ....................................... 403/43 X |
| 4,406,065 | 9/1983 | Köhler . |
| 4,419,804 | 12/1983 | Axthammer . |
| 4,461,063 | 7/1984 | Patton . |
| 4,582,259 | 4/1986 | Hoover et al. . |
| 4,688,415 | 8/1987 | Pendelton . |
| 4,689,703 | 8/1987 | Olbrich et al. . |
| 4,902,048 | 2/1990 | Washizu ............................ 285/382 X |
| 5,156,482 | 10/1992 | Owings ................................. 403/43 |
| 5,215,167 | 6/1993 | Davidson ........................... 403/43 X |

FOREIGN PATENT DOCUMENTS

| | | |
|---|---|---|
| 433625 | 9/1967 | Switzerland ............................ 403/43 |
| 497 | of 1892 | United Kingdom . |
| 353923 | 7/1931 | United Kingdom . |
| 627834 | 8/1949 | United Kingdom . |

OTHER PUBLICATIONS

Photographs Photographs of hinge arm referred to in FIGS. 15 and 16 of application, which was manufactured by RAN Enterprises more than one year ago.

Primary Examiner—Terry Lee Melius
Assistant Examiner—Christopher J. Novosad
Attorney, Agent, or Firm—Price, Heneveld, Cooper, DeWitt & Litton

[57] ABSTRACT

A mechanically joined connection includes a tubular extension having a wall defining an interior space, and an insert member having a protruding end, the protruding end being configured to be inserted into the interior space of the tubular extension. The protruding end has an irregular outer surface and the wall is inwardly extruded into close frictional contact with the irregular outer surface around the circumference of the tubular extension, whereby the tubular extension is frictionally and reliably retained on the insert member without the need for separate fasteners. In particular, a wiper pivot assembly for a vehicle is shown including a connecting tube and a pair of pivot forming members mechanically joined at the ends of the tube. Also, a jack extension tube for a vehicle seat is shown including a jack extension screw and nut, and an extension tube mechanically joined to the nut.

12 Claims, 3 Drawing Sheets

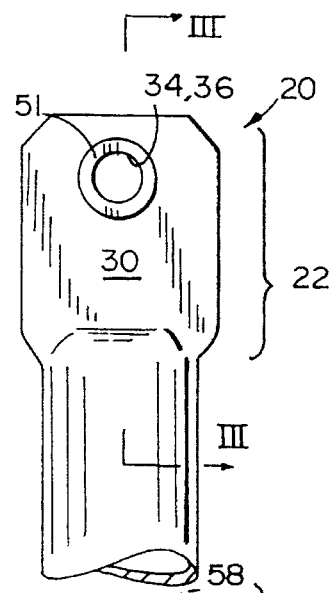
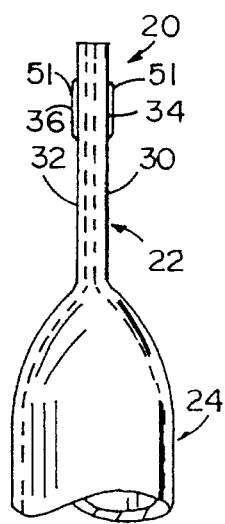
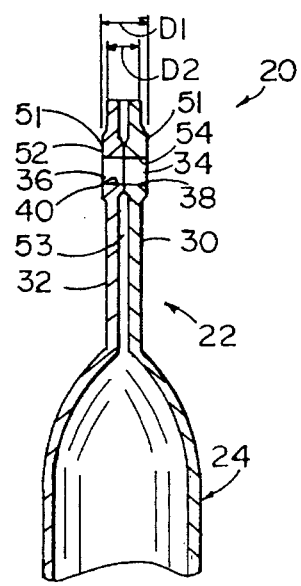
FIG. 1  FIG. 2  FIG. 3
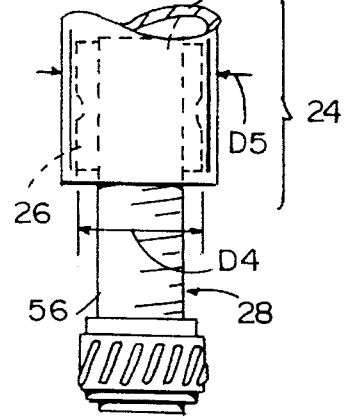
FIG. 4  FIG. 5  FIG. 6
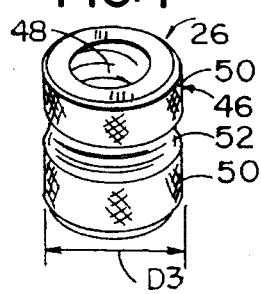
FIG. 7
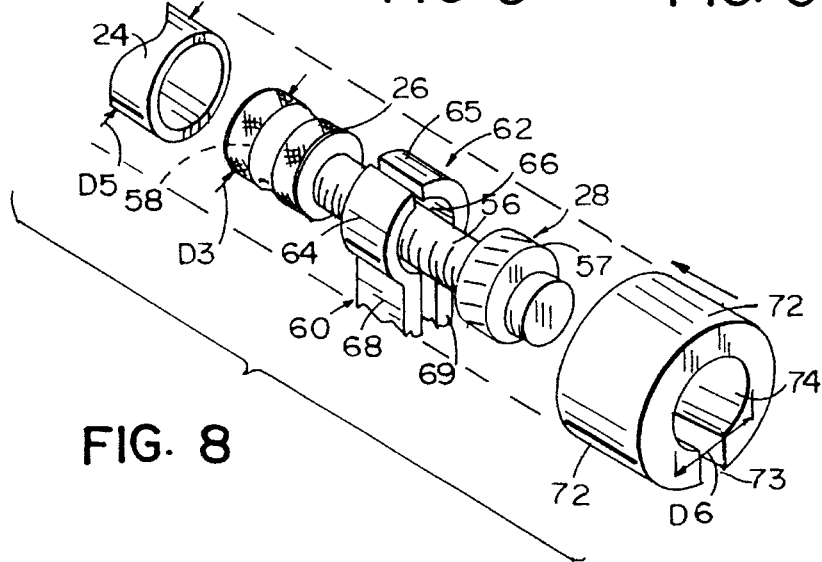
FIG. 8

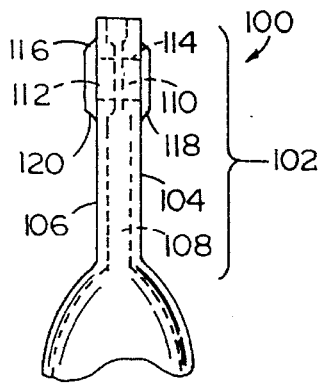
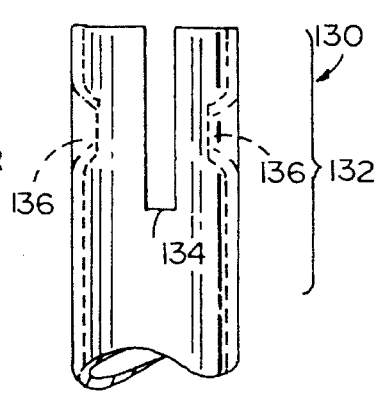
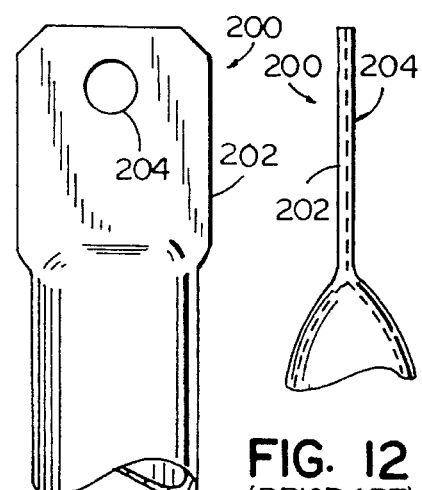
FIG. 9
FIG. 10
FIG. 12
(PRIOR ART)
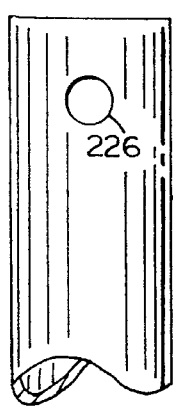
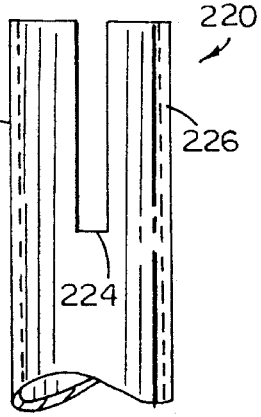
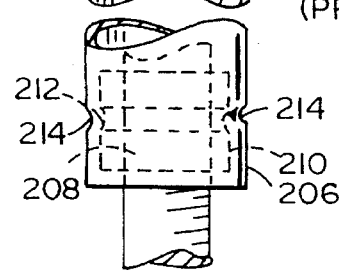
FIG. 11
(PRIOR ART)
FIG. 13
(PRIOR ART)
FIG. 14
(PRIOR ART)
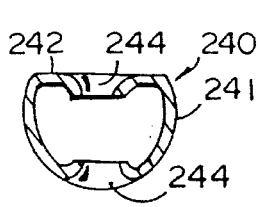
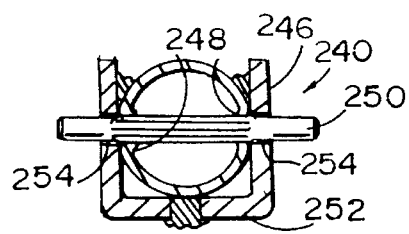
FIG. 15
(PRIOR ART)
FIG. 16
(PRIOR ART)
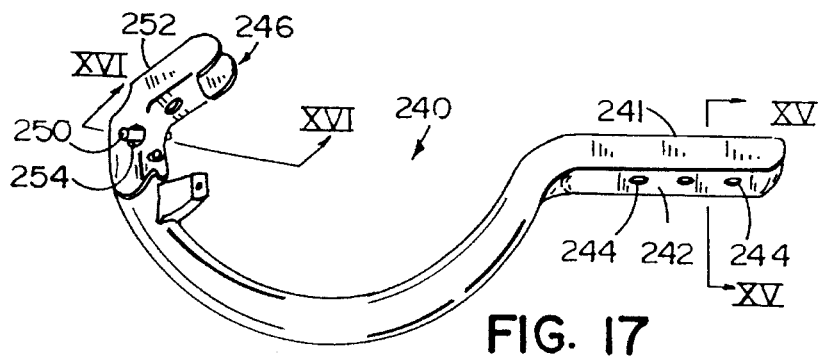
FIG. 17
(PRIOR ART)

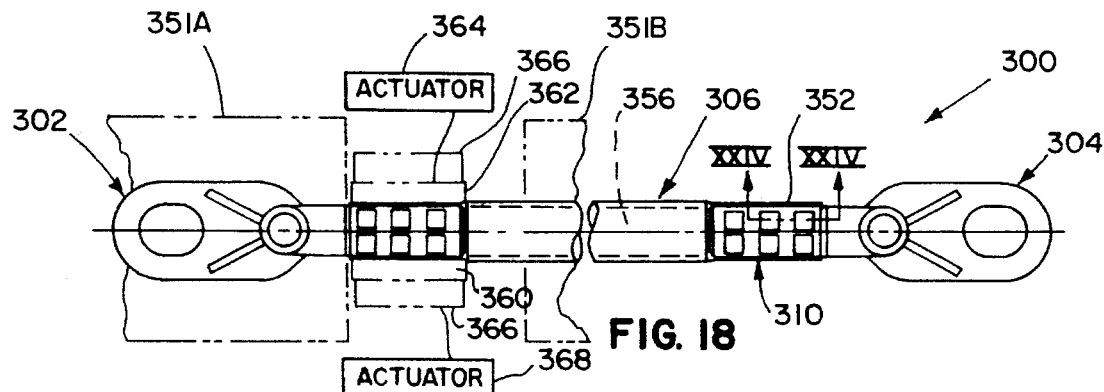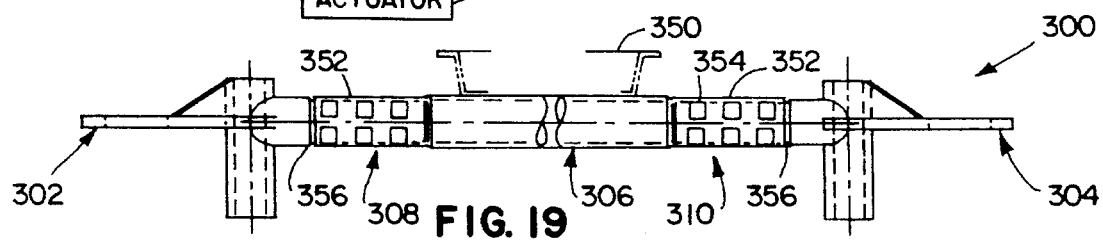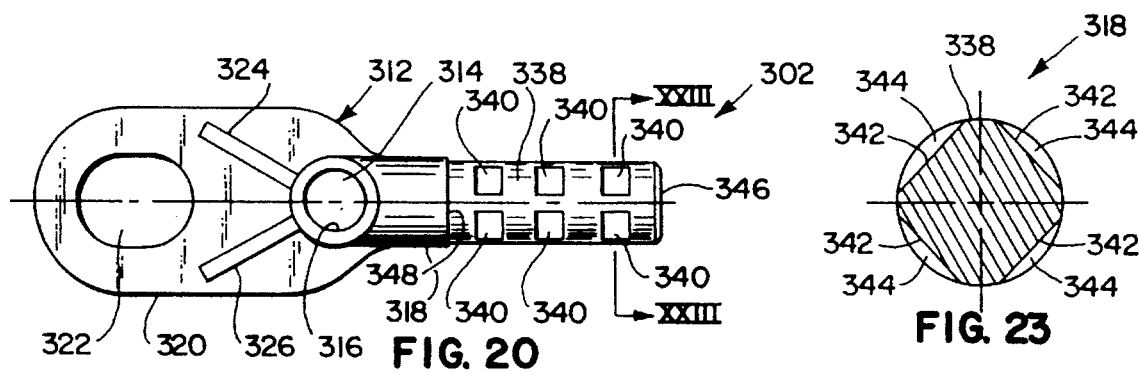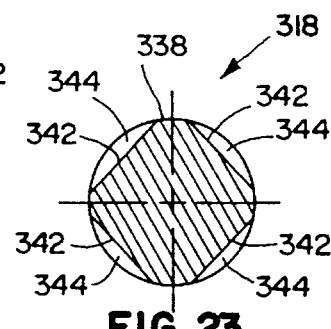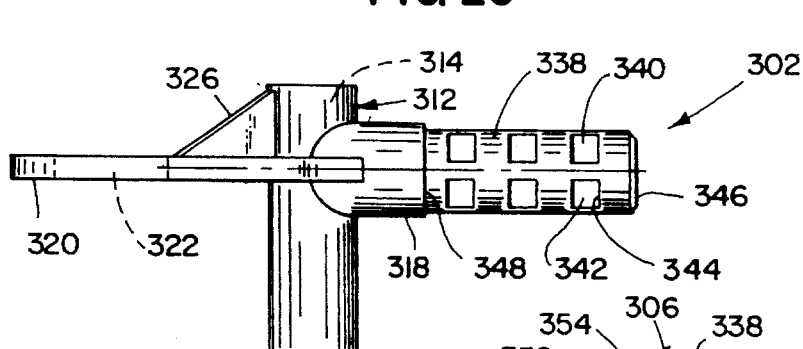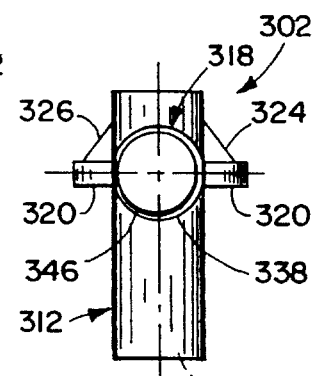

5,536,100

MECHANICALLY JOINED TUBULAR CONNECTION AND PROCESS TO FORM SAME

CROSS REFERENCE TO RELATED APPLICATION

This is a continuation-in-part application of commonly assigned U.S. application patent Ser. No. 07/998,560 filed Dec. 29, 1992, now U.S. Pat. No. 5,312,198, entitled JACK EXTENSION TUBE, to James Kiefer.

BACKGROUND OF THE INVENTION

The present invention concerns a tubular connection, and in particular concerns a mechanically joined tubular connection having improved strength and fatigue resistance.

Load bearing members can be interconnected in a number of different ways. However, it is not always satisfactory to use separate fasteners since fasteners add cost and further require a separate, sometimes tedious, subassembly operation. Further, most fasteners create non-uniform stress distributions on the load bearing members at the connection. This results in high stress areas on the load bearing members potentially leading to premature failure of the load bearing members unless the members are substantially "beefed up" for heavy duty service. However, "beefed up" parts for heavy duty service can add substantially to part cost and weight, both of which are particularly undesirable in the competitive automotive industry. Further, heavy duty parts do not necessarily resolve the failure problems, particularly where the failure is by cyclical loading and fatigue.

Other mechanical fastening methods are also often not satisfactory. For example, press-fitting and/or clinching may not provide the tensile (pull-out) strength desired in the connection, particularly under cyclical loading. Non-mechanical fastening methods are also often not acceptable. For example, welding can cause non-uniform stress distribution in which case the welded assembly is sensitive to fatigue failure. Further, welding requires the use of skilled labor and close quality control to control variations in weld strength.

One known patent, U.S. Pat. No. 4,419,804 to Axthammer, discloses a method including inwardly hammering an outer tube onto an inner pin. However, this process requires a complex tool with multiple moving parts, which tool may not have the long-term durability or consistency desired when manufacturing a high volume part. Further, the material of the outer tube is not flowed uniformly onto the inner pin, but instead is hammered by repeated hits onto the inner pin, which hammering moves the material in small increments. The hammering method would necessarily be quite loud, and further may undesirably affect the outer tube material properties.

Thus, a tubular connection having improved strength and uniformity of stress distribution and also a method of manufacture solving the aforementioned problems is desired.

SUMMARY OF THE INVENTION

The present invention includes a process for forming a mechanical connection. The process includes providing a tube having a wall defining an interior space, and an insert member having an irregular outer surface configured to be positioned in the interior space. The process includes positioning the irregular outer surface of the insert member in the interior space, and uniformly flowing the wall of the tube inwardly onto the insert member so that the inner surface of the wall closely engages the irregular outer surface of the insert member fully around the irregular outer surface, whereby the insert member is frictionally retained in the tube.

In another aspect, the present invention includes a process for forming a mechanical connection including providing a tube and an insert member configured to be positioned in the tube, and providing a split die configured to deform the tube into frictional engagement with the insert member substantially fully around the circumference of said tube. The process includes positioning the insert member in the tube, positioning the split die about the tube, and forcing the split die to inwardly deform the tube onto the insert member.

In another aspect, the present invention includes a wiper pivot assembly including a pivot forming member including a first section having surfaces defining a bearing, and further including a protruding section extending from the first section. The wiper pivot assembly further includes a tubular member including art end section having a wall defining an interior space. The protruding section includes an outer surface configured to be inserted into the interior space, the protruding section closely engaging the wall circumferentially to form a secure frictional interconnection therebetween.

The preferred embodiments of the present invention include several advantages over known prior art. The insert member is frictionally retained by inwardly extruding the tube onto the insert member. This provides a significant increase in tensile pullout strength of the connection over known clinched connections used in similar environments, the increase being about double the tensile pullout force of the prior known clinched connections. Further, the inwardly extruded connection provides a very uniform stress distribution and consistent tensile strength, and is thus resistant to fatigue or tensile failure. Still further, the joint can be reliably and consistently made without substantial quality control and testing, and without the need for highly skilled labor. Also, the process utilizes types of equipment generally familiar to skilled laborers such as die repair and machine repair workers.

These and other features, advantages and objects of the present invention will be further understood and appreciated by those skilled in the art by reference to the following specification, claims and appended drawings.

BRIEF DESCRIPTION OF THE DRAWINGS

FIG. 1 is a broken side view of a jack extension tube embodying the present invention;

FIG. 2 is a fragmentary side view of the jack extension tube in FIG. 1 but taken orthogonally to FIG. 1;

FIG. 3 is a sectional view taken along the plane III—III in FIG. 1;

FIG. 4 is a sectional schematic view showing the piercing of opposing apertures in the tube and the extruding of flanges around the apertures;

FIGS. 5–6 are sectional schematic views showing the collapsing of the flattened end of the tube while causing the inwardly extruded flanges to abut and also while forming embossments around the apertures;

FIG. 7 is a perspective view of a threaded nut-like member of the type used in the present invention;

FIG. 8 is a perspective view of the jack extension tube including the raw tube, the threaded member and jack screw, the die halves for inwardly extruding the tube onto the threaded member, and the doughnut-shaped extruding die driver;

FIG. 9 is a fragmentary side view of a modified jack extension tube;

FIG. 10 is a fragmentary side view of another modified jack extension tube;

FIGS. 11–14 are side and orthogonal views of two known, prior art jack extension tubes;

FIGS. 15–16 are cross sections taken from the prior art tubular hinge arm shown in FIG. 17;

FIG. 17 is a side view of a prior art tubular hinge arm;

FIG. 18 in a plan view of a wiper pivot assembly embodying the present invention;

FIG. 19 is a side view of the wiper pivot assembly shown in FIG. 18;

FIGS. 20–22 are orthogonal views of the pivot forming member shown in FIG. 18;

FIG. 23 is a cross-sectional view taken along the lines XXIII—XXIII in FIG. 20; and FIG. 24 is a cross-sectional view taken along the lines XXIX—XXIX in FIG. 18.

DESCRIPTION OF PRIOR ART

A known jack extension tube 200 (FIGS. 11 and 12) of prior art includes a metallic tubular section having a flattened end 202 with a drilled or punched transverse hole 204 located therein and also includes a second end 206 spaced from flattened end 202. Second end 206 has a predetermined inner diameter, and is configured so that it can press-fittingly receive a cylindrically-shaped nut 208 with knurled outer surface 210. After the press-fitting, second end 206 is clinched at opposing locations 214 to force tube material partially into ring-like groove 212 in nut 208 so as to provide additional frictional resistance to movement of nut 208 in tube 200.

A second known jack extension tube 220 (FIGS. 13 and 14) of prior art includes a metallic tubular section having an end 222 with a pair of slits 224 therein for receiving a flat blade-like member (not shown). A pair of aligned holes 226 are drilled or punched in end 222 perpendicular to slits 224 so that a bolt (not shown) can be extended through holes 226 and through the flat member to retain the flat member in slits 224 in end 222. The other end of tube 220 is substantially the same as end 206 in tube 200.

A prior art tubular hinge arm 240 is shown in FIG. 17, and two cross sections of the prior art tubular hinge arm 240 are shown in FIGS. 15 and 16. The first cross section (FIG. 15) is taken through a first end 241 and includes a flat side 242. A pair of opposing aligned holes 244 are pierced and extruded inwardly on the tube before the tube is flattened, after which flat side 242 is formed with one of the holes 244 ending up on the flat side 242. Holes 244 are used to threadably receive a self-tapping screw (not shown) to secure the hinge arm 240 to a vehicle body panel. Tubular hinge arm 240 further includes a second end 246 for which a second cross section is shown in FIG. 16. As shown, two aligned holes 248 are extruded inwardly and a pivot pin 250 with longitudinal serrations is press-fit therein. A bracket 252 is spot welded to the second end. Bracket 252 stiffens tube end 246 but does not support pivot pin 250 directly since it includes enlarged holes 254 that space bracket 252 away from pivot pin 250.

DETAILED DESCRIPTION OF PREFERRED EMBODIMENTS

A jack extension tube 20 (FIGS. 1–3) embodying the present invention includes a first end 22 adapted to be operably connected to a vehicle seat (not shown) and a second end 24 with a threaded nut-like member 26 frictionally secured therein. A jack screw 28 is operably received in the threaded member so that by operating a seat adjuster powering mechanism (not shown) connected to the jack screw 28, the jack screw 28 is rotated thus causing the jack extension tube 20 to extend/retract to reposition the vehicle seat as desired. Jack extension tube 20 is constructed so as to exhibit improved tensile strength and fatigue resistance over prior known jack extension tubes such as that shown in FIGS. 11, 12 herein while providing manufacturability for consistent manufacture.

More particularly, first end 22 (FIGS. 1–3) is generally formed by extruding aperture forming flanges in tube 20 and then deforming or collapsing tube sidewalls 30 and 32 toward each other until the extruded flanges formed in sidewalls 30 and 32 contact each other. Specifically, before the step of collapsing and while tube end 22 is still in the round, apertures 34 and 36 are punched into tube end 22 by opposed punches such as those shown at 37 (FIG. 4). This is accomplished by supporting the outside surface of the sidewalls of tube end 22 during the step of punching, such as by stabilizing the tube end 22 with die halves 39A and 39B. At the same time (or in a separate step), apertures 34 and 36 are extruded inwardly to form inwardly oriented flanges 38 and 40. One or more pilot pins 42 are then placed through apertures 34 and 36 (FIG. 5), and sidewalls 30 and 32 are pressed together with sufficient force such as by dies 44 and 45 to cause sidewalls 30 and 32 to collapse substantially flat and proximate each other but spaced apart slightly (FIG. 6). Deforming dies 44 and 45 include a pair of recesses 48, 50 for forming an embossment 51 on each sidewall 30, 32 around each apertures 34 and 36, embossments 51 assisting in the reverse extrusion process noted below so that wall section 52 is fully formed.

Notably, as sidewalls 30 and 32 are collapsed (FIG. 6) and/or as the punch 42 is withdrawn (FIG. 4), material around apertures 34 and 36 is reverse extruded and forced to form a substantially continuous cylindrical tubular wall section 52 (FIG. 3). Wall section 52 defines an enlarged surface area 54 having a thickness D1 that is about equal to or greater than the total thickness D2 of sidewalls 30 and 32 plus the space 53 therebetween. The extrusion and reverse extrusion also work-hardens wall section 52 providing increased strength. Also, the enlarged surface area 54 defining apertures 34 and 36 provides an increased bearing surface area, which area has increased wear resistance for pivotal attachment of a vehicle seat such as by a pin or shoulder bolt shaft or self-tapping screw or other fastener. Notably, wall section 52 provides an enlarged surface engageable by a self-tapping screw or fastener, the enlarged area serving to increase the thread strip resistance of the assembly as the self-tapping screw is torqued into position. For example, in testing, wall section 52 has provided a strip torque of about 40–50 NM, as compared to the strip torque of the prior art device shown in FIGS. 11, 12 of about 22 NM.

Threaded nut-like member 26 (FIG. 7) includes a cylindrically-shaped outer surface 46 and a threaded inner hole 48, the threads in hole 48 being configured to mateably engage the threaded shaft of jack screw 28. Outer surface 46 includes serrated rings 50 separated by a groove-like ring 52.

Serrated rings 50 each include a diamond-shaped pattern of serrations around their circumference. Notably, member 26 can be several different lengths depending upon design requirements. The diameter D3 of outer surface 46 is such that member 26 can be press-fit into the inner diameter D4 of second end 24 of tube 20.

Jack screw 28 (FIGS. 1 and 8), with which the present invention is designed for use, includes a threaded shaft 56 adapted to engage the threads in hole 48 of threaded member 26, and a spiral gear 57 for engaging the seat adjuster powering mechanism. The end 58 opposite spiral gear 57 is peened over or otherwise is configured so that jack screw 28 cannot be fully unscrewed out of threaded member 26. Thus, jack screw 28 is limited in its longitudinal, fore-to-aft movement in threaded member 26.

In the present invention, second end 24 of jack extension tube 20 is inwardly extruded onto threaded nut-like member 26. By this method, the tensile strength of threaded member 26 in tube end 24 (i.e., the frictional resistance of threaded member 26 from being pushed/pulled out of tube end 24) has been found to be 5000 pounds force or more. This compares to about 2200 pounds under the prior art device shown in FIG. 11 and discussed earlier (i.e., wherein the nut was press-fit and clinched).

The process of inwardly extruding second end 24 is illustrated in FIG. 8 and includes press-fittingly positioning nut 26 within tube second end 24 with jack screw 28 extended a distance out of nut 26. A pair of finger-like extruding members 60 and 62 are shaped to mateably close against each other on tuber end 24. Members 60 and 62 include upper portions 64 and 65 which close to define an aperture 66 and lower portions 68 and 69 for manipulating upper portions 64 and 65. When closed together, aperture 66 defines a shape having a diameter less than outer tube diameter D5 of tube end 24. A doughnut-shaped sleeve-like driver die 72 includes an aperture 74 having an inside diameter D6 greater than spiral gear 57 so that it can slip longitudinally over the end of jack screw 26 onto upper portions 64 and 65. The inner diameter D6 of driver die 72 and the thickness of upper portions 64 and 65 are predetermined so that driver die 72 mateably compresses upper portions 64 and 65 against tube end 24 as driver die 72 is moved onto upper portions 64 and 65 over tube end 24. Also, driver die 72 includes a slot 73 therein shaped to receive lower portions 68 and 69 to prevent interference with extruding members 60 and 62 during the extruding operation.

With threaded nut-like member 26 inserted into tube end 24, extruding members 60 and 62 are closed onto tube end 24 and driver 72 is extended over spiral gear 57 onto extruding members 60 and 62. Driver 72 thus forces extruding members 60 and 62 inwardly onto tube end 24 thus inwardly extruding the material of tube end 24 onto threaded nut-like member 26. In particular, material of tube end 24 is forced into close engagement with the knurled surface on serrated rings 50 and into groove-like ring 52 on all sides thereof. This close engagement provides uniform and substantially complete contact against the perimeter of threaded nut-like member 26, thus assuring increased strength and durability and long life. Once driver 72 is removed, extruding members 60 and 62 are separated and readied for the next part to be processed.

In the preferred form, it is contemplated that the jack extension tube 20 will be about 10 inches long and extendable to about 12¼ inches, however the invention is contemplated to include various length tubes either shorter or longer and having shorter or longer extension lengths. In the preferred form, it is contemplated that the tube will be made from SAE 1018 HR-RW tube of about 0.875 inch outside diameter and 16 gauge wall thickness, however the invention is contemplated to include tubes of various diameters, wall thicknesses and material composition. For example, the tube could also be made of aluminum.

A modified jack extension tube 100 (FIG. 9) embodying the present invention is substantially similar to jack extension tube 20, but jack extension tube 100 includes flattened end 102 wherein a space 108 is left between both sidewalls 104 and 106 and also between extruded flanges 114 and 116 formed in sidewalls 104 and 106. Specifically, inwardly extruded apertures 110 and 112 in flattened sidewalls 104 and 106 are defined by the inwardly extruded flanges 114 and 116, with flanges 114 and 116 being positioned proximate each other but not in abutting contact (FIG. 9). Notably, embossments 118 and 120 are formed on the exterior of sidewalls 104 and 106 by reverse extrusion as punch 37 is withdrawn (i.e., similar to FIG. 4) and/or as the sidewalls 104 and 106 are flattened (i.e., similar to FIGS. 5 and 6). If necessary, an insert (not shown) can be placed in the end of tube end 102 to support flanges 114 and 116 in their spaced condition during the step of collapsing tube end 102.

Another modified jack extension tube 130 embodying the present invention is shown in FIG. 10. Jack extension tube 130 does not include a flattened end, but rather includes a slotted end 132 with a pair of slots 134 aligned across a diameter of the tube for receiving a flat blade-like member (not shown) and a pair of inwardly extruded apertures 136 positioned radially perpendicular to slots 134. The flat blade-like member has a thickness so that it can be positioned in slots 134, and further includes an attachment hole so that a bolt or screw can be extended through apertures 136 to secure the flat member in place. It is contemplated that apertures 136 can be reverse extruded or embossed, as previously described in relation to jack extension tubes 20 and 100, depending upon the functional requirements of the particular part being manufactured.

Thus, there is provided jack extension tubes having improved ends providing a more durable and stable attachment. In one end, the jack extension tubes include inwardly extruded holes, which may be formed against each other for improved structure and strength. In the other end, the jack extension tubes include an inwardly extruded portion that closely engages a threaded nut-like member positioned therein, the inwardly extruded portion exhibiting improved frictional tensile strength for holding the threaded nut-like member in place.

WIPER PIVOT ASSEMBLY

A wiper pivot assembly 300 (FIGS. 18 and 19) embodying the present invention includes a pair of pivot forming members 302 and 304 securely interconnected by a tubular extension member or tube 306 at mechanically joined connections 308 and 310. By use of the mechanically joined connections 308 and 310, a very secure connection can be made having a substantially uniform stress distribution and uniform level of internal stress which is resistant to failure by fatigue. The connection can be made without the use of separate fasteners, sophisticated materials or processes requiring highly skilled labor. Such a secure connection is especially desirable in a vehicle wiper system which encounters long term cyclical loading, and which has safety considerations upon failure.

In wiper pivot assembly 300, pivot forming members 302 and 304 are identical, and thus only pivot forming member 302 and mechanical connection 308 will be described hereinafter. Pivot forming member 302 (FIG. 20) is a die cast part substantially formed as cast, but machined as required. It is noted that member 302 could be made in other ways such as by molding, mechanically forming, and the like. Pivot forming member 302 includes a functional end or section 312 defining a bore 314. Surfaces 316 on bore 314 define a bearing for receiving windshield wiper arms (not specifically shown) for a vehicle. A protrusion 318 extends perpendicularly to bore 314 from section 312 in a first direction, and a flange 320 extends in an opposite direction from section 312. Flange 320 is planar, and includes an oblong opening 322 spaced from bore 314 for receiving a fastener (not shown). Webs or ribs 324 and 326 support flange 320 at an orthogonal position relative to section 312.

Protrusion 318 is a solid cylindrically-shaped member defining an irregular outer surface 338. It is contemplated that irregular outer surface 338 can be a number of different shapes. In the preferred embodiment shown, irregular outer surface 338 is a cylindrically-shaped and substantially smooth but includes a pattern of depressions 340 formed therein. Depressions 340 are defined by flat surfaces 342 and generally perpendicularly oriented surfaces 344 located at the longitudinal ends of flat surfaces 342 (FIG. 23). Four depressions 340 are located circumferentially around protrusion 318 in a square type pattern, and a series of three such patterns are located longitudinally along the length of protrusion 318 (FIG. 20). Protrusion 318 further includes a lead-in taper 346 at one end to facilitate extending tube 306 onto protrusion 318, and also includes a shoulder 348 at the inner end of protrusion 318. A bracket 350 for securing wiper pivot assembly 300 to a vehicle is welded or otherwise secured to tube 306.

Tube 306 (FIG. 18) includes an end section 352 having a wall defining an interior space 356. Tube 306 is secured to pivot forming member 302 (and 304) by a process substantially identical of that disclosed in FIG. 8. In particular, extruding members or split die halves 360 and 362 are positioned by actuators 364 about tube 306 with tube 306 press-fittingly positioned on protrusion 318 of pivot forming member 302 (or 304). It is contemplated that split die halves 360 and 362 can have different shapes, such as the shapes shown for die members 60 and 62 in FIG. 8. Tube 306 and pivot forming member 302 are held in position by fixturing 351A and 351B. A driver die 366 (comparable to driver 72 in FIG. 8) is moved transversely into a position around tube 306 by actuator 368, and then is moved toward (or away from) pivot forming member 302. Drive die 366 has a tapered inner hole which engages die halves 360 and 362 and drives die halves 360 and 362 inwardly. This causes die halves 360 and 362 to engage and deform the wall 356 of tube 306 into close integral contact with irregular outer surface 338 substantially fully around the circumference of protrusion 318, thus forming a secure non-rotatable frictional interconnection therebetween. In particular portions of the wall of tube end section 352 are deformed into depressions 340, with the deformed wall portions 354 interlockingly engaging depressions 340 and in particular interlocking with perpendicularly oriented surfaces 342 (see FIGS. 23 and 24), and the remainder of tube end section 352 closely frictionally engaging irregular outer surface 338. It is noted that die halves 360 and 362 extrude the material of wall 356 inwardly in a uniform and consistent manner, thus allowing maximum control over the joint strength and consistency (including longitudinal dimensional consistency).

Thus, a mechanically joined connection and process for same is provided. The connection includes a tube defining all interior space, and a member including an irregular outer surface configured to be inserted into the interior space. The tube is uniformly flowed inwardly circumferentially into close frictional engagement with the irregular outer surface to thus form a mechanically joined connection having a substantially uniform stress distribution which is resistant to fatigue failure by cyclical loading and which does not require the use of separate fasteners or highly sophisticated technologies or highly skilled labor.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows.

1. A wiper pivot assembly for a vehicle comprising:

a tubular member defining a longitudinal direction including opposing end sections each having a wall defining an interior space: and pivot-forming members secured in each of the opposing end sections a predetermined distance apart, the pivot-forming members each including a first section having a bore with a cylindrically-shaped surface for operably and stably supporting a wiper and defining an axis of rotation generally perpendicular to the longitudinal direction, and further including an integral protruding section extending laterally from said first section, and still further including an attachment flange and ribs for stabilizing the first section relative to the attachment flange, said protruding section including an outer surface configured to be inserted into and frictionally held in said interior space, said wall closely engaging said protruding section circumferentially to form a secure non-rotatable frictional interconnection therebetween, said wall that engages the outer surface being characterized by material that is extruded inwardly and that has a stress distribution that provides substantially improved tensile strength that is higher than conventional staked connections.

2. A wiper pivot assembly as defined in claim 1 wherein said outer surface includes irregularities configured to increase the frictional engagement of said wall with said outer surface.

3. A wiper pivot assembly as defined in claim 2 wherein said outer surface includes depressions and said wall includes material deformed into said depressions in interlocking engagement.

4. A wiper pivot assembly as defined in claim 1 wherein said protruding section includes a cylindrically shaped surface and further includes multiple flat surfaces arranged in a predetermined pattern on said cylindrically shaped surface.

5. A pivot assembly for a vehicle comprising:

a pivot including a first section having an elongated cylindrically-shaped bore defining a centerline and configured to operably, pivotally, and stably support a wiper for a vehicle, and further including an integral protrusion extending laterally from the first section perpendicular to the centerline, and still further including an attachment flange and non-parallel ribs extending between the first section and the attachment flange for supporting the first section on the attachment flange; and an extension including a tubular section receiving and non-rotatingly, frictionally engaging and thus securely retaining said protrusion therein.

6. A pivot assembly as defined in claim 5 wherein said protrusion includes an irregular outer surface configured to provide interfering frictional engagement with said tubular section.

7. A pivot assembly as defined in claim 6 wherein said outer surface includes a plurality of spaced recesses.

8. A pivot assembly as defined in claim 6 wherein said pivot comprises a die cast member.

9. A pivot assembly as defined in claim 8 wherein said extension comprises a tube.

10. A pivot assembly as defined in claim 9 wherein said bore is machined to a predetermined diameter for receiving a vehicle wiper assembly.

11. A wiper pivot assembly for vehicles comprising:

a tubular structural member including spaced apart opposing end sections defining a longitudinal direction; and first and second die-cast members each including a protruding section, a pivot-forming section, and an attachment flange, each of the protruding sections being non-rotatingly, securely retained in one of the opposed end sections so that the pivot-forming sections are fixedly and accurately spaced apart, each of the pivot-forming sections including an elongated cylindrically-shaped surface for pivotally and stably supporting a vehicle wiper and for defining an axis of rotation generally perpendicular to the longitudinal direction, each of the attachment flanges including an aperture for receiving an attachment fastener and further including reinforcement webs for rigidifying the attachment flange relative to the pivot-forming section.

12. A wiper assembly as defined in claim 11 wherein the protruding section and the attachment flange are positioned on opposing sides of the pivot-forming section.

* * * * *

UNITED STATES PATENT AND TRADEMARK OFFICE
CERTIFICATE OF CORRECTION

PATENT NO. : 5,536,100
DATED : July 16, 1996
INVENTOR(S) : James (NMI) Keifer

It is certified that error appears in the above-identified patent and that said Letters Patent is hereby corrected as shown below:

On title page, item [54] and col. 1,

In the Title:
    Delete "AND PROCESS TO FORM SAME";

Column 1, line 9:
    "application patent" should be --patent application--;

Column 2, line 20:
    "art end" should be --an end--;

Column 8, line 3:
    "all interior" should be --an interior--.

Signed and Sealed this

Tenth Day of August, 1999

Attest:

Q. TODD DICKINSON

Attesting Officer     Acting Commissioner of Patents and Trademarks